United States Patent
Nelogal et al.

(10) Patent No.: US 9,077,761 B2
(45) Date of Patent: Jul. 7, 2015

(54) SYSTEM AND METHOD FOR SCALABLE, EFFICIENT, AND ROBUST SYSTEM MANAGEMENT COMMUNICATIONS VIA VENDOR DEFINED EXTENSIONS

(75) Inventors: Chandrashekar Nelogal, Round Rock, TX (US); Surender Brahmaroutu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 414 days.

(21) Appl. No.: 13/028,317

(22) Filed: Feb. 16, 2011

(65) Prior Publication Data

US 2012/0207155 A1    Aug. 16, 2012

(51) Int. Cl.
*H04L 12/28* (2006.01)
*H04L 29/06* (2006.01)
*G06F 13/42* (2006.01)
*H04L 1/00* (2006.01)
*H04L 29/08* (2006.01)

(52) U.S. Cl.
CPC ............ *H04L 69/22* (2013.01); *G06F 13/4282* (2013.01); *H04L 1/0079* (2013.01); *H04L 69/324* (2013.01)

(58) Field of Classification Search
CPC ....................................................... H04L 12/56
USPC .................................. 370/254, 389, 392, 401
See application file for complete search history.

(56) References Cited

U.S. PATENT DOCUMENTS

| | | | | |
|---|---|---|---|---|
| 7,502,818 | B2 * | 3/2009 | Kohno et al. ................. | 709/203 |
| RE43,668 | E * | 9/2012 | Pogrebinsky ................ | 370/229 |
| 2003/0069988 | A1 * | 4/2003 | Rune et al. .................... | 709/237 |
| 2004/0017784 | A1 * | 1/2004 | Backlund ...................... | 370/256 |
| 2008/0177861 | A1 | 7/2008 | Basani | |
| 2008/0235363 | A1 | 9/2008 | Shah | |
| 2009/0019278 | A1 | 1/2009 | Shah | |
| 2009/0080412 | A1 * | 3/2009 | Yoneyama et al. ........... | 370/352 |
| 2009/0083760 | A1 | 3/2009 | Slaight | |
| 2010/0097931 | A1 * | 4/2010 | Mustafa ........................ | 370/235 |
| 2010/0195712 | A1 * | 8/2010 | Yu et al. ................... | 375/240.01 |
| 2012/0047309 | A1 * | 2/2012 | Natu et al. ..................... | 710/314 |
| 2012/0166891 | A1 * | 6/2012 | Dahlen et al. .................. | 714/54 |

\* cited by examiner

*Primary Examiner* — Man Phan
*Assistant Examiner* — Nourali Mansoury
(74) *Attorney, Agent, or Firm* — Baker Botts L.L.P.

(57) ABSTRACT

In accordance with the present disclosure, a system and method for transmitting communications over a transmission medium between a first component and a second component is provided. The system and method may include an information handling system in which a packet is defined. The packet may include at least one header at a specific bit location and a vendor defined header extension, located in a packet payload portion of the packet. The system and method may further include at least one control command defined within the information handling system. The at least one control command may, for example, be used to negotiate the meaning of at least one field in the header. In addition, the at least one control command may be used to handle and recover from errors within communications and to control the flow of communications once transmission has commenced.

20 Claims, 3 Drawing Sheets

SYSTEM AND METHOD FOR SCALABLE, EFFICIENT, AND ROBUST SYSTEM MANAGEMENT COMMUNICATIONS VIA VENDOR DEFINED EXTENSIONS

TECHNICAL FIELD

The present disclosure relates generally to the operation of computer systems and information handling systems, and, more particularly, to a System and Method for Scalable, Efficient, and Robust System Management Communications via Vendor Defined Extensions.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

Information handling systems may include multiple controllers and peripheral devices. The controllers may communicate with and manage peripheral devices or groups of peripheral devices. In some instances, the controllers may also communicate between each other. Communications may take place over a variety of communication paths, such as a system management bus ("SMBus"). A Management Component Transport Protocol (MCTP) defines the way in which information is exchanged between the controllers and devices and between two controllers. In particular, the MCTP defines a packet structure for communications and a list of control commands to be sent by controllers to other devices. One problem with the MCTP, however, is that the structure of the required packet limits the length of communications between the controllers and the other controllers/peripheral devices. This decreases the scalability of MCTP packets in applications that require large data transmission. Additionally, the MCTP is generally error intolerant, as the protocol does not provide a way to recover from errors in communications or series of communications.

SUMMARY

In accordance with the present disclosure, a system and method for transmitting communications over a transmission medium between a first component and a second component is provided. The system and method may include an information handling system in which a packet is defined. The packet may include at least one header at a specific bit location and a vendor defined header extension, located in a packet payload portion of the packet. The system and method may further include at least one control command defined within the information handling system. The at least one control command may, for example, be used to negotiate the meaning of at least one field in the header. In addition, the at least one control command may be used to handle and recover from errors within communications and to control the flow of communications once transmission has commenced.

The system and method disclosed herein is technically advantageous because it provides a scalable and generally error tolerant method of communication between components in an information handling system. The packet may include a wide range of configurations defined by a vendor, which allows the packet to be used for a broad range of communication types and packet lengths. Additionally, the control commands may be defined and customized to suit the specific needs of a vendor and the vendor-specific application. Existing communication methods are limited in variability by a pre-defined packet configuration and are similarly limited in the pre-defined control commands that can be implemented.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
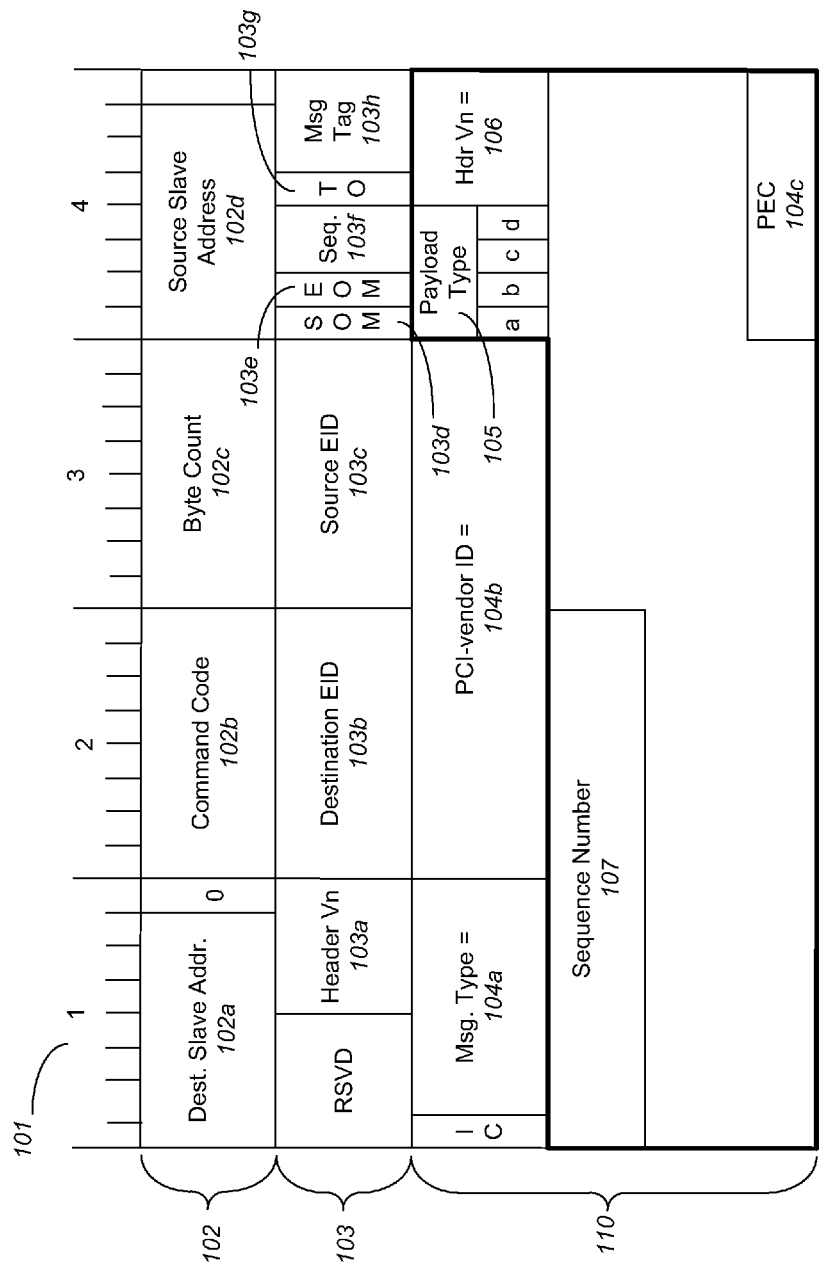
FIG. 1 is an MCTP packet incorporating aspects of the present invention.

The present application is directed to a system and method for management communications via vendor defined extensions. Aspects of the present invention may, for example, be used to incorporate vendor defined extensions into the MCTP to increase the functionality and scalability of the MCTP. In some embodiments, the extensions to the MCTP may be defined by the vendor of components in the information handling system that use MCTP packets to communicate. FIG. 1 is an example MCTP packet incorporating aspects of the present invention. The packet 101 includes three sections: the medium specific header 102, the MCTP transport header 103, the packet payload 110. The packet 101 is, for illustrative purposes, shown with a scale across the top that identifies the bit/byte length of each field of the packet. Each of the medium-specific header 102 and MCTP transport header 103 are 4 bytes long, as required by the MCTP. The headers 102 and 103 carry transmission data—data used to order and transmit communications between elements. The medium-specific header 102 differs according to the transmission medium through which the MCTP communications are transmitted. The medium-specific header 102 of FIG. 1, for example, is specific to SMBus/I2C and incorporates a SMBus binding protocol. The MCTP header 103 is defined in the MCTP and is used for MCTP transmissions regardless the medium. The packet payload 110 includes the data specific to the transmission between controllers and devices in the system and incorporates portions defined in the MCTP—IC, Message Type 104a, PCI Vendor ID 104b—as well as extensions of the MCTP, per aspects of the present invention, as will be discussed below.

The medium-specific header 102, according to the SMBus binding protocol, includes four sections. The destination slave address field 102a and the source slave address field 102d indicate the destination and source of the packet, respectively. The command code field 102b identifies the type of communication, and the byte count field 102c indicates the length of the packet in bytes after the byte count section 102c. Notably, the length of the packet is constrained by the 1 byte length of the byte count field, limiting the possible byte length to 256 bytes.

The MCTP transport header 103 is similarly 4 bytes in length and is present in each MCTP packet transmitted. The MCTP transport header includes a header version field 103a, which identifies the format of the MCTP common fields, such as fields 103b-103h. The MCTP transport header 103 includes sections for the source and destination of the packet, 103b and 103c, respectively. The MCTP transport header further includes fields used to track the sequence of transmitted communication, sent as a series of packets if the command or message is too large to fit into one packet. The first packet of a sequence of packets is indicated by setting the bit in the Start of Message (SOM) field 103d, and the last package of the sequence is indicated by setting the bit in the End of Message (EOM) field 103e. Each packet in the series is further identified by a sequence number placed in the sequence field 103f of the MCTP transport header 103. The sequence section 103f is 2-bits wide, meaning that the maximum sequence of packets allowed using the MCTP transport header is limited to 4.

The packet payload 110 follows directly after the MCTP transport header 103 and carries the message and control information of the communications between controllers and devices. The MCTP requires certain fields within the packet payload 110, including a message type field 104a in at least the first packet of a sequence of packets to indicate the message type of the packet payload 110. Message types include a MCTP control message or a message type used to support vendor defined messages (VDMs), where the vendor is defined according to a PCI-based vendor ID or an IANA-based vendor ID. Another MCTP required field in the PCI-based vendor IF field 104b. The packet payload 110 shown in FIG. 1 incorporates VDMs by a vendor identified with by PCI-based vendor ID identified in field 104b. The packet error code (PEC) field 104c is also required in all MCTP SMBus transmissions and allows the destination of the message to check the transmitted packet for errors.

The bold portion of the packet payload 110 incorporates aspects of the present invention, including a payload type field 105, header versions field 106, and sequence number field 107, which all may be included as part of an extension of the MCTP header information found in both the medium-specific header 102 and the MCTP transport header 103. The extensions may be defined, for example, by the vendor identified in the PCI-based vendor ID field 104b of the packet payload 110. The header version field 106 may be used to identify the format of the MCTP extension, as defined by the vendor. The payload type field 105 is four-bits in length and is defined to indicate information about the payload being carried by the MCTP packet/message. In the example shown, the payload type field 105 includes four one-bit flag fields 105a, 105b, 105c, and 105d that identify whether the data is a control command or a data packet, an end point specific payload or a vendor-defined payload, and if compression was used on the data within the packet payload. As one of ordinary skill in the art viewing this disclosure would appreciate, the length of the payload type field 105, as well as the meanings of the flags within the packet payload type field 105, can be modified and expanded, as the packet payload 110 provides ample space for expansion. This is advantageous because the MCTP limits the bit space in which the headers and field can be placed.

As previously mentioned, the MCTP transport header 103 includes a two-bit wide sequence field 103f, which orders the packets of a single message but limits the length of a message to four packets. When the message information that needs to be transmitted via MCTP message is large, such as RAID storage configuration data, four packets may not be sufficient to transmit the necessary data. The sequence number field 107 extends the header to carry a packet count value which is 16-bits wide. The length of the sequence number field 107 extension can be varied depending on the amount of data in one message that needs to be transmitted, as one of ordinary skill in the art viewing this disclosure would appreciate.

Figure 2:
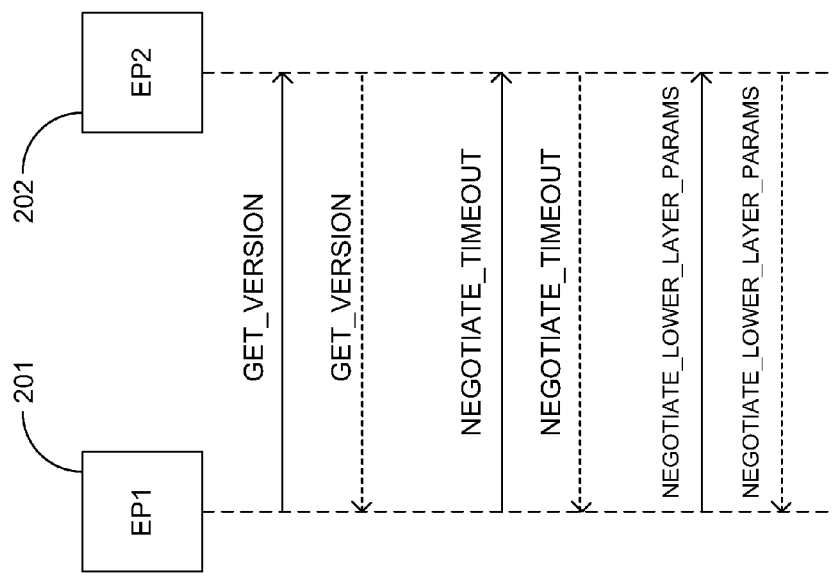
FIG. 2 illustrates control commands NEGOTIATE_TIMEOUT and NEGOTIATE_LOWER_LAYER_PARAMS, defined according to aspects of the present invention.

Other aspects of the present invention include vendor defined extensions of the MCTP to include newly defined control packets and commands that increase the scalability, functionality, and error tolerance of the MCTP. The new control packets may be transmitted, for example, using the header extensions described above, such as the payload type field 105 in the packet payload 104. One new control command may be referred to as NEGOTIATE_TIMEOUT. The NEGOTIATE_TIMEOUT control command may be one of numerous commands defined to determine communication conditions, such as timeout values, between two elements. As is shown in FIG. 2, the NEGOTIATE_TIMEOUT command may be issued by an MCTP endpoint as part of initial communications between MCTP endpoint 201 and MCTP endpoint 202. The MCTP endpoint 201 may, for example, may be a controller, such as an Integrated Dell™ Remote Access Controller (iDRAC), or a service processor. The MCTP endpoint 202 may also be a controller, for example, a Dell™ PowerEdge Expandable RAID Controller (PERC), or a peripheral device, such as a storage drive within a RAID array. In FIG. 2, MCTP endpoint 201 sends MCTP control command GET_VERSION to MCTP endpoint 202, and the MCTP endpoint 202 transmits a response message in return, which may in some instances, comprise multiple packets. The NEGOTIATE_TIMEOUT control command may be used to establish numerous timeout values between the MCTP endpoint 201 and the MCTP endpoint 202 that govern future communications between the endpoints. For example, the timeout values may determine the maximum waiting-time for a first response packet following command and/or the maximum-waiting time for the complete response after a first response packet is received. As one of ordinary skill in the art viewing this disclosure would appreciate, other timeout values are possible, such as the maximum waiting-time between packets sent in a series.

Another example extension of the MCTP, according to aspects of the present invention, includes the definition of new control command that can be used to alter the meaning of header fields defined by either the MCTP or a medium-specific binding protocol, such as for an SMBus. One example is a NEGOTIATE_LOWER_LAYER_PARAMS control command that can change the meaning of the Byte Count field 102c of the medium-specific header 102 in FIG. 1. The MCTP endpoint 201 may send the command to the MCTP endpoint 202, and the MCTP endpoint 202 and the MCTP endpoint 201 may negotiate to change the meaning of the Byte Count field to mean word count, double word count, or quad word count. This allows the length of the packet to be extended up to, for example, 2048 bytes, instead of the 256-byte limitation mentioned earlier. This is particularly advantageous where the MCTP endpoint 202 is the controller for a large storage system, such as a RAID system, and the configuration data needed to set up the storage system may be many kilobytes. The NEGOTIATE_LOWER_LAYER_PARAMS control command is also advantageous because it allows for the necessary length to be negotiated between the MCTP endpoint 201 and MCTP endpoint 202, as shown in FIG. 2, so that the possible packet size is large enough to accommodate the necessary message lengths, but not larger than it needs to be for the type of data to be transmitted.

Figure 3:
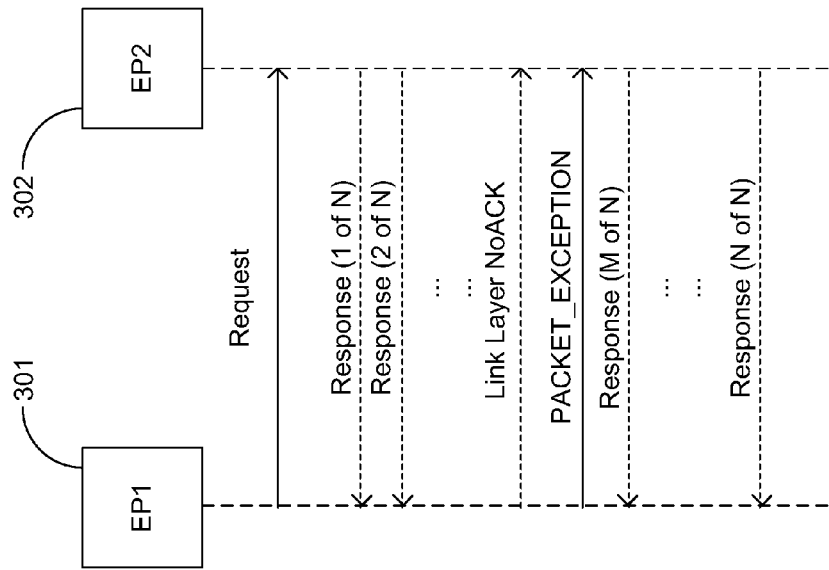
FIG. 3 illustrates control command PACKET_EXCEPTION, defined according to aspects of the present invention.

The MCTP may also be expanded, according to aspects of the present invention, to increase error tolerance. The MCTP is generally intolerant regarding errors in transmission, as it does not provide a way to correct for errors or to communicate the reasons for errors in communications between MCTP endpoints. For example, if a message from one endpoint to another includes an out-of-order packet, the message assembly may be terminated. A PACKET_EXCEPTION control command, defined according to aspects of the present invention, allows, for example, a first endpoint to send a command to a second endpoint identifying an error in a received message so that the second endpoint may correct for the error, if possible. FIG. 3 identifies an application of the PACKET_EXCEPTION control command, where MCTP endpoint 301 sends a request to MCTP endpoint 302. The MCTP endpoint 302 may then respond to the request with a plurality of response packets comprising a single message. The MCTP endpoint 201 may identify an error and send a Link Layer NoACK error message to the end point, suspending transmission of response packets. The errors may include, but should not be seen as limited to, an out-of-order packet, a PEC error, an error in multiple packets, a busy source, or the unavailability of the target of the response. The MCTP endpoint 301 may send the PACKET_EXCEPTION control command to the MCTP endpoint 302 identifying the specific error, to which the MCTP endpoint 302 can adjust and continue transmitting packets.

Figure 4:
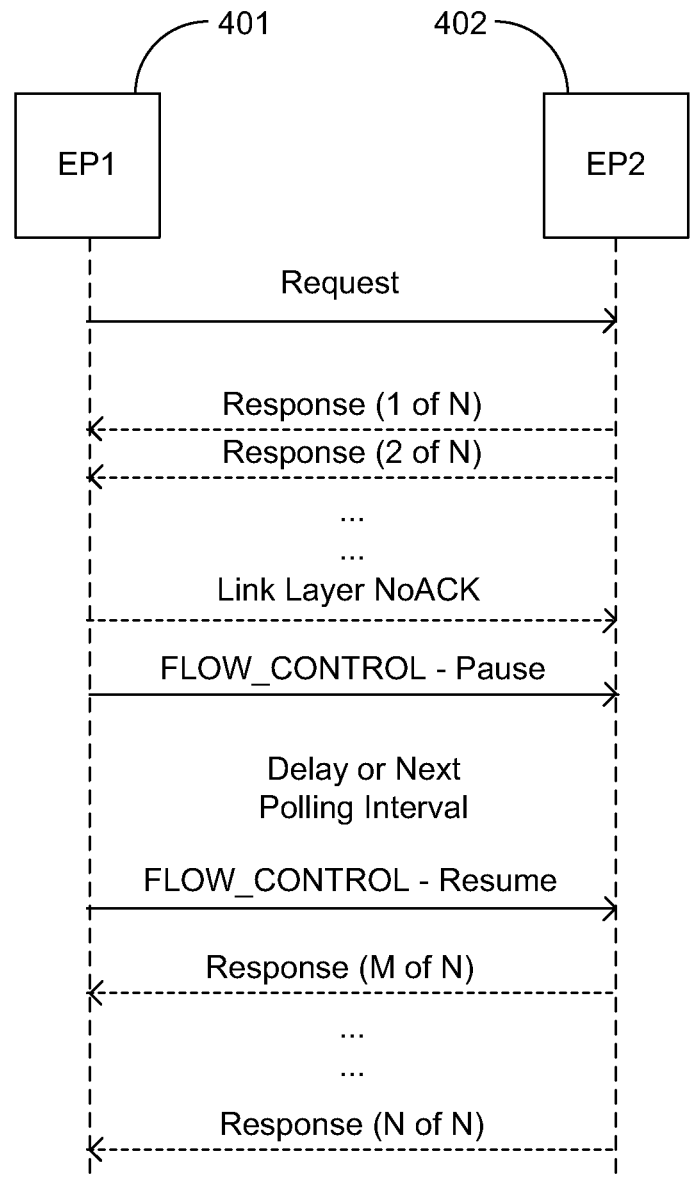
FIG. 4 illustrates control command FLOW_CONTROL, defined according to aspects of the present invention.

The functionality of the MCTP may also be expanded, according to aspects of the present invention, by the definition of a FLOW_CONTROL control command. Presently, the MCTP does not allow for transmission of MCTP packets to be suspended once the transmission of a message has begun. This is problematic where endpoints are busy or otherwise unable to continue receiving or sending a message. As seen in FIG. 4, MCTP endpoint 401 sends a request to MCTP endpoint 402. The MCTP endpoint 402 may then respond to the request with a plurality of response packets comprising a single message. The MCTP endpoint 401 may then send the FLOW_CONTROL-PAUSE control command to the MCTP endpoint 402, directing MCTP endpoint 402 to pause transmission of response packets. After some delay, such as a predefined polling interval, the MCTP endpoint 401 sends a FLOW_CONTROL-RESUME control command to the MCTP endpoint 402, which then resumes transmitting response packets to the MCTP endpoint 401.

The extensions of the MCTP mentioned above are advantageous, because they increase the functionality, scalability, and error tolerance of the MCTP. By expanding both the length of each packet and the number of packets that can be in a sequence, the MCTP can be used to effectively transmit very large messages, such as RAID configurations, between controllers and peripheral devices over an SMBus, for example, whereas previously the length of a message was restrained. Additionally, the expansion of the MCTP to include additional control commands aides in the efficient use of processing power in both the controller and the peripheral devices.

Although the present disclosure has been described in detail, it should be understood that various changes, substitutions, and alterations can be made hereto without departing from the spirit and the scope of the invention as defined by the appended claims.

What is claimed is:

1. A system for transmitting communications over a transmission medium between a first component and a second component, comprising:
   an information handling system;
   a packet defined within the information handling system, comprising
      at least one header, wherein the at least one header includes at least one field for storing data about the packet, and wherein the at least one header tracks a sequence of transmitted communications between the first component and the second component;
      a packet payload, wherein the packet payload includes at least part of a message or a command from the first component to the second component;
      a header extension of the at least one header, wherein the header extension is located, at least partially, in the payload packet and the at least one header is located outside of the packet payload; and
      a length of the packet, wherein the length of the packet is negotiated by the first component and the second component to provide efficient transmission of the packet, wherein the negotiated length is based, at least in part, on the message or the command;
      wherein the packet includes a sequence number placed in a sequence field of the header, wherein the command is a control command; and
   a response message, wherein the second component transmits the response message in response to receiving the control command, and wherein the response message comprises multiple packets;
   a pause control command, wherein the pause control command directs the second component to pause transmission of the response message;

a resume control command, wherein the resume control command is sent to the second component after a delay to cause the second component to retransmit the response message;

wherein the packet payload comprises control information;

wherein the second component comprises a controller for controlling one or more devices; and wherein the one or more devices are configured by the second component based, at least in part, on the control information.

2. The system for transmitting communications of claim 1, wherein the header extension is defined by a vendor of one of the first component or the second component.

3. The system for transmitting communications of claim 1, wherein the header extension includes a field that identifies the packet in a series of packets.

4. The system for transmitting communications of claim 1, wherein the header extension includes a payload-type field identifying characteristics of data included in the packet payload.

5. The system for transmitting communications of claim 4, wherein the payload-type field includes at least one flag bit.

6. The system for transmitting communications of claim 5, wherein the at least one flag bit identifies whether compression was used on the data within the packet payload.

7. The system for transmitting communications of claim 5, wherein the at least one flag bit identifies whether the payload is a vendor-defined payload.

8. The system for transmitting communications of claim 1, wherein the packet is a Management Component Transport Protocol (MCTP) packet.

9. A method for transmitting communications between a first component and a second component in an information handling system over a transmission medium, comprising:

defining a packet, wherein the packet includes at least one header, and wherein the at least one header tracks a sequence of transmitted communications between the first component and the second component;

defining a first command for negotiating between the first component and the second component to determine a meaning of at least one field in the at least one header;

defining a second command for negotiating between the first component and the second component to determine a communication condition;

defining a length of the packet, wherein the length of the packet is negotiated by the first component and the second component to provide efficient transmission of the packet, wherein the negotiated length is based, at least in part, on a message or a command;

configuring by the second component one or more devices controlled by the second component based, at least in part, on control information of the packet, wherein the packet includes a sequence number placed in a sequence field of the at least one header, and wherein the first command is a control command;

receiving a response message, wherein the second component transmits the response message in response to receiving the control command, and wherein the response message comprises multiple packets;

defining a pause control command, wherein the pause control command directs the second component to pause transmission of the response message; and defining a resume control command, wherein the resume control command is sent to the second component after a delay to cause the second component to retransmit the response message.

10. The method for transmitting communications of claim 9, wherein the packet is a Management Component Transport Protocol (MCTP) packet.

11. The method for transmitting communications of claim 9, wherein the at least one field in the at least one header comprises a Byte Count field.

12. The method for transmitting communications of claim 9, wherein the communication condition includes at least one timeout value.

13. The method for transmitting communications of claim 12, wherein the at least one timeout value includes a maximum wait time between a first communication and a second communication sent in response to the first communication.

14. The method for transmitting communications of claim 9, further comprising the step of defining a third command that transmits a cause of a communication error.

15. The method for transmitting communications of claim 10, wherein the cause of a communication error includes an out-of-order packet.

16. The method for transmitting communications of claim 9, further comprising the step of defining a control command that pauses transmission of packets between the first component and the second component.

17. A system for transmitting communications over a transmission medium between a first component and a second component, comprising:

an information handling system;

a packet defined within the information handling system, comprising at least one header, wherein the at least one header includes at least one field for storing data about the packet, and wherein the at least one header tracks a sequence of transmitted communications between the first component and the second component;

a packet payload, wherein the packet payload includes at least part of a message or a command from the first component to the second component;

a header extension of the at least one header, wherein the header extension is located, at least partially, in the payload packet and the at least one header is located outside of the packet payload;

a length of the packet, wherein the length of the packet is negotiated by the first component and the second component to provide efficient transmission of the packet, wherein the negotiated length is based, at least in part, on the message or the command;

wherein the packet payload comprises control information;

wherein the second component comprises a controller for controlling one or more devices;

wherein the one or more devices are configured by the second component based, at least in part, on the control information; and wherein the packet includes a sequence number placed in a sequence field of the header;

at least one control command defined within the information handling system, wherein the at least one control command is used to negotiate between the first component and the second component to determine a meaning of at least one field in the at least one header, a response message, wherein the second component transmits the response message in response to receiving the at least one control command, wherein the response message comprises multiple packets;

a pause control command, wherein the pause control command directs the second component to pause transmission of the response message; and a resume control command, wherein the resume control command is sent to the second component after a delay to cause the second component to retransmit the response message.

18. The system for transmitting communications of claim 17, wherein the packet is an MCTP packet.

19. The system for transmitting communications of claim 17, wherein the at least one control command further includes a command used to negotiate between the first components and the second component at least one communication condition.

20. The system for transmitting communications of claim 17, wherein header extension is defined by a vendor of one of the first component or the second component.

* * * * *